United States Patent
Chen et al.

(10) Patent No.: US 6,826,015 B2
(45) Date of Patent: Nov. 30, 2004

(54) FLUX CONCENTRATING STITCHED WRITE HEAD

(75) Inventors: Mao-Min Chen, San Jose, CA (US); Pokang Wang, San Jose, CA (US); Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 10/453,048

(22) Filed: Jun. 3, 2003

(65) Prior Publication Data

US 2003/0193739 A1 Oct. 16, 2003

Related U.S. Application Data

(62) Division of application No. 09/570,235, filed on May 12, 2000, now Pat. No. 6,591,480.

(51) Int. Cl.[7] .................................................. G11B 5/31
(52) U.S. Cl. ....................................................... 360/126
(58) Field of Search ................................ 360/126, 317, 360/119, 122

(56) References Cited

U.S. PATENT DOCUMENTS

| | | | |
|---|---|---|---|
| 5,452,164 A | | 9/1995 | Cole et al. ................. 360/113 |
| 5,473,491 A | * | 12/1995 | Fujisawa et al. ............ 360/126 |
| 5,621,596 A | | 4/1997 | Santini ........................ 360/126 |
| 5,652,687 A | | 7/1997 | Chen et al. .................. 360/126 |
| 5,802,700 A | | 9/1998 | Chen et al. ............... 29/603.14 |
| 5,805,391 A | | 9/1998 | Chang et al. ................ 360/113 |
| 5,872,693 A | * | 2/1999 | Yoda et al. .................. 360/126 |
| 6,278,580 B1 | * | 8/2001 | Sasaki ......................... 360/126 |
| 6,317,288 B1 | * | 11/2001 | Sasaki ......................... 360/126 |
| 6,320,726 B1 | * | 11/2001 | Sasaki ......................... 360/126 |
| 6,353,995 B1 | * | 3/2002 | Sasaki et al. ................ 360/317 |
| 6,462,915 B1 | * | 10/2002 | Sasaki ......................... 360/317 |
| 6,483,665 B1 | * | 11/2002 | Sasaki ......................... 360/126 |
| 6,525,903 B1 | * | 2/2003 | Sasaki ......................... 360/126 |
| 6,557,241 B1 | * | 5/2003 | Sasaki ......................... 360/126 |
| 6,570,739 B2 | * | 5/2003 | Hsiao et al. ................. 360/317 |
| 6,603,641 B1 | * | 8/2003 | Sasaki ......................... 360/317 |
| 2002/0048115 A1 | * | 4/2002 | Sasaki et al. ................ 360/126 |

* cited by examiner

*Primary Examiner*—Craig A. Renner
(74) *Attorney, Agent, or Firm*—George O. Saile; Stephen B. Ackerman

(57) ABSTRACT

A flux concentrating stitched write head design for high data rate applications is provided. The flux concentration is achieved by means of a non-magnetic step embedded into a portion of the lower magnetic pole of the write head, just beneath the write gap layer. The design permits extremely short throat heights, which will be required by future high data rate applications.

10 Claims, 3 Drawing Sheets

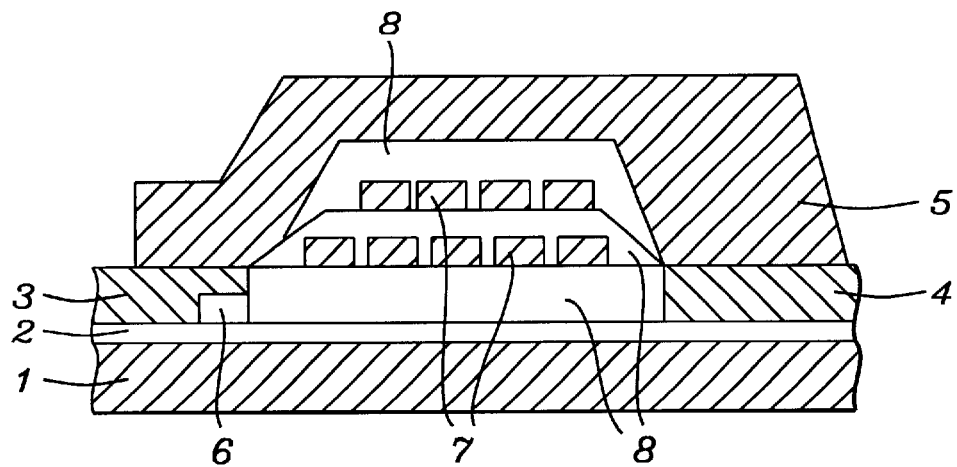
FIG. 1 - Prior Art
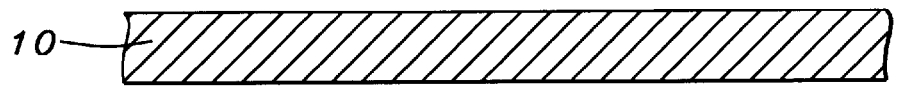
FIG. 2a
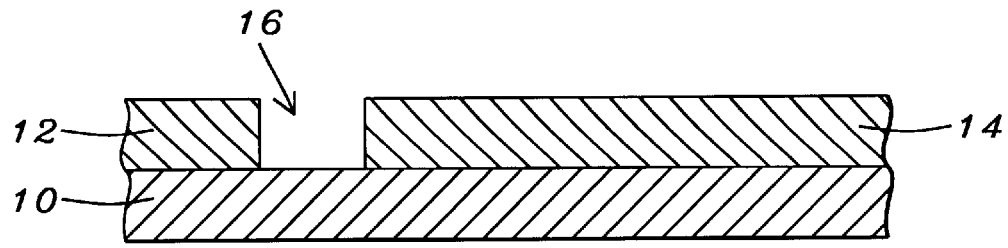
FIG. 2b
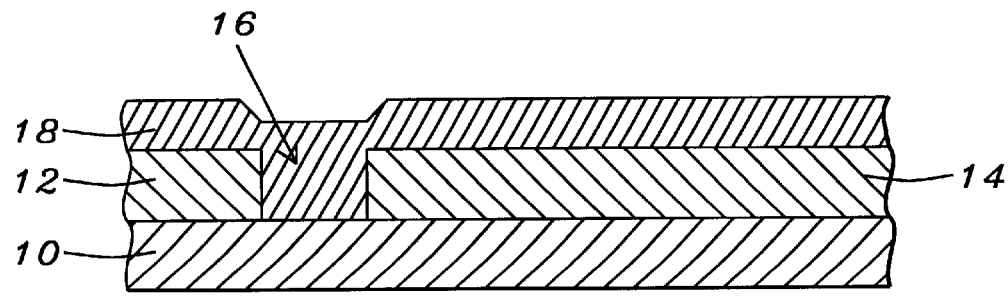
FIG. 2c

FLUX CONCENTRATING STITCHED WRITE HEAD

This is a division of patent application Ser. No. 09/570,235, filing date May 12, 2000, now U.S. Pat. No. 6,591,480, A Novel Flux Concentration Stitched Write Head Design For High Data Rate Application, assigned to the same assignee as the present invention.

BACKGROUND OF THE INVENTION

1. Field of the Invention

This invention relates to the fabrication of a thin-film magnetic head. In particular, it relates to a method of fabricating a stitched writer portion of such a head that is suitable for high data-rate recording of magnetic information.

2. Discussion of the Related Art

Thin film magnetic heads are used to record and retrieve data stored in the form of small magnetized regions on disks and tapes. These heads contain a read portion, which is typically a shielded magnetic field sensor of a giant magneto-resistive (GMR) type, and a write portion, consisting of a magnetic pole and yoke structure inductively energized by current carrying coils.

The need to record and retrieve data stored with increasing area densities and at increasingly higher data rates has necessitated the design of very narrow write heads with high linear resolution. The narrow write head allows data to be stored in correspondingly narrow tracks. The high linear resolution, which is achieved by the formation of a thin write gap and a strong magnetic field, allows the storage of more data per unit length of track.

An important advance in the fabrication of write heads that help to meet these stringent requirements is the so called "stitched write head design." This design embodies a simplified method of forming a narrow upper magnetic pole piece by joining or "stitching" together two separately deposited pole pieces, the upper pole tip and the upper pole yoke, along a pedestal formed from a portion of the upper pole tip photoresist mask. In contrast to methods that form the upper pole piece and yoke monolithically, the stitching process allows the narrow tip section to be formed within a thinner photoresist mask, which is highly advantageous in the context of the fabrication process.

The performance of the stitched writer design and the advantages inherent in the nature of its fabrication process can be further improved by overcoming several deficiencies which limit its applicability to high data-rate recording. In particular, the stitched writer head as formed by the methods of the present art has a lengthy throat region along which the magnetic flux is diminished. Thus, in order to maintain an acceptable flux level for recording at the air-bearing surface (ABS), the design requires a high saturation writing current. This, in turn, causes side erasures and adversely affects data already written on adjacent disco areas.

Several methods have been advanced to improve the flux characteristics of the stitched writer design and, indeed, to improve such other designs as have been suggested to meet the need for high recording resolution. Chang et al. (U.S. Pat. No. 5,805,391) teach a method for forming a write head with a recessed stitched yoke on a planar portion of an insulating layer. The contour of said insulating layer minimizes the flux leakage between the yoke portion and the pole tip portion stitched to it. Two inventions of Chen et al. (U.S. Pat. No. 5,652,687 and U.S. Pat. No. 5,802,700) teach methods for forming a write head having a U-shaped notch which opens out at the air-bearing surface and between whose ends is formed the upper pole tip. The structure so formed provides a parallel path for conducting the magnetic flux to said pole tip, thereby allowing the proper flux concentration for writing in narrow trackwidths. The invention of Cole et al. (U.S. Pat. No. 5,452,164) teaches a method of forming a pole tip structure that lays both above and below the write gap and has a track width of less than 1 micron. The symmetry of this arrangement supports good flux transfer with no leakage. The invention of Santini (U.S. Pat. No. 5,621,596) provides a method for improving the resolution of the photolithography process that is used to define the shape of the pole tip. Specifically, the invention teaches a method of reducing light reflections in the photolithography process by moving the point at which the pole yoke flares sufficiently far back from the position of the pole tip so that reflections from the flare do not interfere with the definition of the pole tip.

An alternative approach to improving the flux characteristics of the stitched pole design involves concentrating the flux by improving the geometry of the junction between the upper pole tip and upper pole yoke. This is presently being achieved by a design (FIG. 1) that incorporates a recessed upper pole yoke (FIG. 1 (5)) and a "step" (FIG. 1 (6)) formed of non-magnetic material positioned in the rear underside of the pole tip where it contacts the write gap layer. The step effectively channels the flux through a smaller area, thereby increasing its intensity across the write gap region (FIG. 1 (2)) and enhancing the writing process. Although the use of the step provides a significant improvement in the stitched head design, its placement in the pole tip will ultimately prove to be disadvantageous as thinner pole tips and shorter throat heights are increasingly necessitated for high data-rate applications. The present invention teaches a method for fabricating a recessed yoke, stitched head writer with the flux concentrating advantages of the step formation, but without the disadvantages of the step placement in the upper pole tip.

SUMMARY OF THE INVENTION

A first object of this invention is to fabricate a stitched pole, magnetic write head that is capable of recording magnetic data at high rates and increased densities.

A second object of this invention is to fabricate a stitched pole magnetic write head that has a lower saturation write current.

A third object of this invention is to fabricate a stitched pole magnetic write head with improved nonlinear transition shift performance.

A fourth object of this invention is to fabricate a stitched pole magnetic write head having improved overwrite performance.

A fifth object of this invention is to fabricate a stitched pole magnetic write head that significantly reduces the problem of side erasure.

A sixth object of this invention is to fabricate a stitched pole magnetic write head with a reduced effective throat height and upper pole thickness.

These objects will be achieved by means of a novel modification of the present stitched pole, stepped pole-piece fabrication process. The proposed modification is the removal of the step from the underside of the upper pole piece and its effective repositioning in the form of a "recessed step," a non-magnetic spacer embedded into an upper layer of the lower pole of the write head, said spacer thereby being placed beneath the write gap layer of said write head. The flux concentrating region so formed is less sensitive to the position of the upper pole piece, thereby allowing the formation of a shorter throat height as will be required in future high data rate applications.

BRIEF DESCRIPTION OF THE DRAWINGS

FIG. 1 is a schematic, cross-sectional view of a stitched pole write head with a stepped upper pole piece designed according to the prior art.

FIG. 2a is the first of a series (FIG'S. 2a-2h) of schematic cross-sectional views of a stitched pole write head designed and fabricated according to the objects and methods of the present invention. FIG. 2a is a schematic view of a plated first part of the read head, which can be an upper shield of an associated read head portion of a read/write head (not shown), and which is the lower pole piece of the write head.

FIG. 2b is a schematic view of said plated first part, over which has now been plated a second part of of the write head. This second part has been patterned with an opening which, when filled, will become the recessed, embedded step.

FIG. 2c is a schematic view of the fabrication in FIG. 2b, over which a dielectric layer has been formed.

DESCRIPTION OF THE PREFERRED EMBODIMENT

Figure 2D:
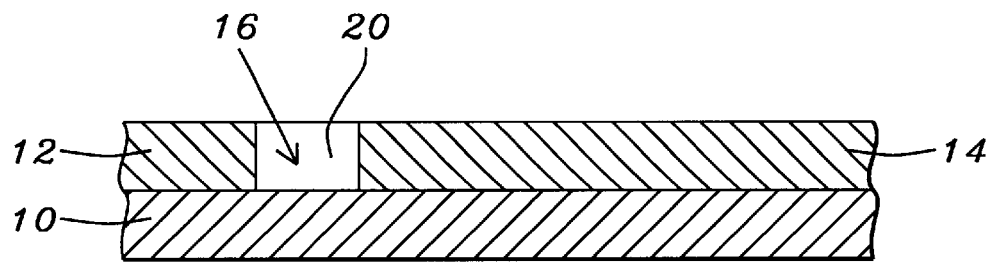
FIG. 2d is a schematic view of the fabrication of FIG. 2c subsequent to the formation of an embedded step by the CMP process removal of said dielectric layer.

Referring first to FIG. 1, there is shown for comparison purposes only a schematic sketch of a stitched pole writer designed in accordance with the prior art and not using the methods of the present invention. The writer consists of a lower pole (1), which can also be the upper shield of a read head element positioned beneath the writer, a write gap (2), an upper pole piece with a front portion (3) and a rear portion (4) and an upper pole yoke that is stitched to the upper pole pieces (5) and magnetically connects them. There is a flux concentrating non-magnetic step (6) formed on the bottom surface of the front portion of the upper pole piece. A coil (7) and insulating region (8) complete the fabrication.

Referring next to FIG. 2a, there is seen a schematic cross-sectional view of a plated first part of a lower pole piece (10) which forms the substrate for the fabrication of the present invention. Said lower pole piece, which is formed of (80/20) NiFe with a thickness range between 1.0 microns and 2.0 microns, can also serve as the upper shield of a read head portion of the read/write head, said read head portion being advantageously positioned beneath the write head of the present invention.

Referring next to FIG. 2b, there is shown the lower pole piece (10) of FIG. 2a, upon which has now been formed, by plating, a second portion of the lower pole piece, which are formed together, in two parts (12), (14), with a gap (16) between them. Said second portion can be composed of either (80/20) NiFe or CoNiFe, with a thickness range between 1.0 microns and 3.0 microns and the gap can have a width ranging from 5.0 microns to 30 microns.

Referring next to FIG. 2c, there is shown the fabrication of FIG. 2b, upon which has now been formed a dielectric layer (18), covering the two parts (12) and (14) and filling the gap (16) between them. Said dielectric is composed of alumina and is formed, by RF diodes sputtering, to a thickness range between 2.0 microns and 4.0 microns.

Referring next to FIG. 2d, there is shown the fabrication of FIG. 2c wherein the dielectric layer referred to as (18) in FIG. 2c has been removed by a process of chemical mechanical polishing (CMP) forming, thereby, an imbedded step (20) within the gap (16).

Figure 2E:
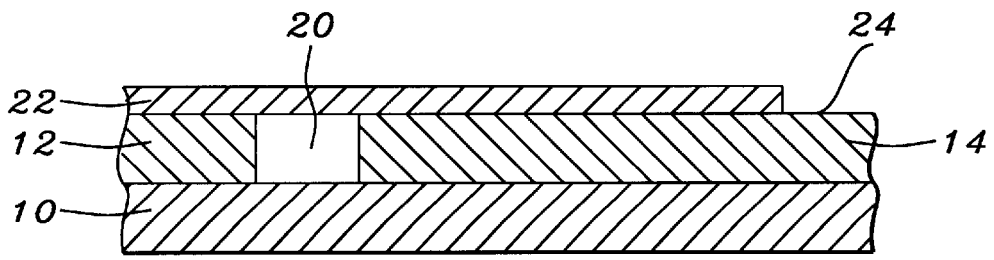
FIG. 2e is a schematic view of the fabrication of FIG. 2d subsequent to the formation of a write gap layer.

Referring next to FIG. 2e, there is shown the fabrication of FIG. 2d upon which has now been formed a write gap layer (22). The write gap layer, which is formed of alumina with a thickness between 0.05 microns and 0.5 microns, does not extend the full length of the second part of the second portion of the lower pole piece (14), leaving a space (24) for the subsequent formation of an upper pole piece that is in magnetic contact with said second part of said lower pole piece (14).

Figure 2F:
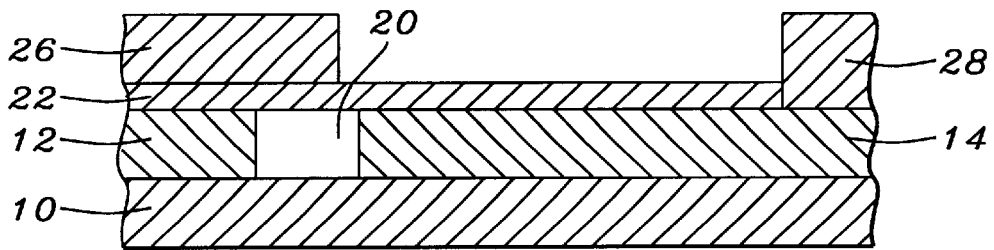
FIG. 2f is a schematic view of the fabrication of FIG. 2e subsequent to the formation of a front and rear portion of an upper pole piece.

Referring now to FIG. 2f, there is shown the fabrication of FIG. 2e upon which has been formed the two parts of the upper pole piece. The front part (26), which will be coplanar with the air-bearing surface and the rear part (28) which is in contact with the lower pole piece (14). Said upper pole piece parts are composed of either $Ni_{45}Fe_{55}$ or CoNiFe and are formed to a thickness between 2.5 microns and 6.0 microns.

Figure 2G:
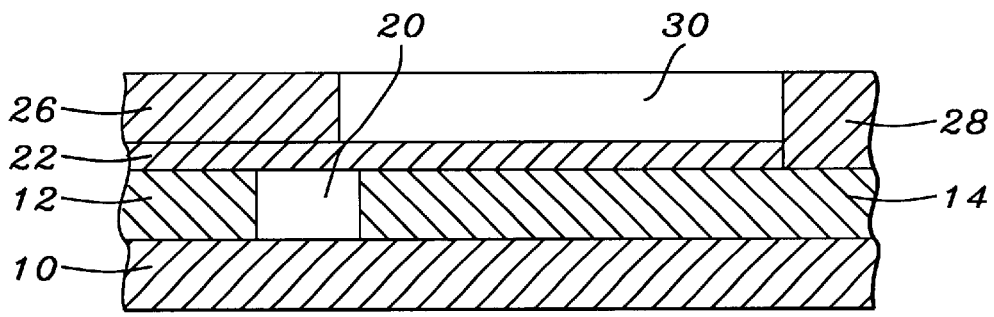
FIG. 2g is a schematic view of the fabrication of FIG. 2f subsequent to the formation of a dielectric layer over said upper pole piece portions and its CMP process removal.

Referring now to FIG. 2g, there is shown the fabrication of FIG. 2f upon which has been deposited, by RF diodes sputtering, an alumina dielectric layer of thickness between 4.0 microns and 9.0 microns. Said layer has then been partially removed by a method of chemical mechanical polishing (CMP) to leave behind a gapfilling layer (30) in the space between the two parts of the upper pole piece (26), (28). The CMP process planarizes the top surface of the fabrication so that it is suitable for the subsequent fabrication of induction coils, insulating layers and an upper pole yoke as will be seen in the following figure.

Figure 2H:
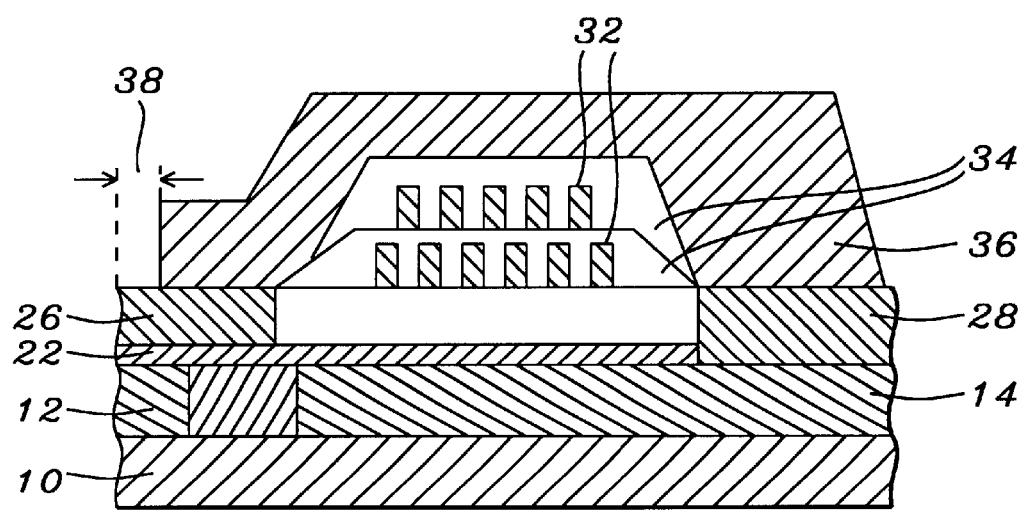
FIG. 2h is a schematic view of the completed stitched writer fabrication, showing the addition of an upper pole yoke, insulators and induction coils. The fabrication in FIG. 2h, in accordance with the present invention, is to be contrasted to that of FIG. 1, fabricated in accordance with the prior art.

Referring finally to FIG. 2h, there is shown a schematic drawing of the final stitched writer designed and fabricated according to the objects and methods of the present invention. Induction coils (32), an insulating layer composed of hard-baked resist (34) and an upper pole yoke (36) formed of $Ni_{45}Fe_{55}$ and $Ni_{80}Fe_{20}$ plated over the upper pole piece have been added to the fabrication of FIG. 2g. The upper pole yoke is recessed from the air-bearing surface (38) by an amount ranging from 0.1 microns to 1.5 microns.

As is understood by a person skilled in the art, the preferred embodiment of the present invention is illustrative of the present invention rather than being limiting of the present invention. Revisions and modifications may be made to methods, processes, materials, structures, shapes and dimensions through which is formed a flux concentration stitched write head design for high data rate application, while still providing a flux concentration stitched write head design for high data rate application, formed in accord with the present invention as defined by the appended claims.

What is claimed is:

1. A flux concentrating stitched write head comprising:

a substrate, which is a first part of a lower magnetic pole piece;

a second part of the lower magnetic pole piece formed on said first part, said second part comprising a front portion and a rear portion separated by a gap between said two portions that is conformally filled by a dielectric material to form, thereby, an embedded step;

a planarized write gap layer formed over said second part of said lower magnetic pole piece and embedded step whereby said write gap layer extends completely over said front portion of said second part and and partially over said rear portion said embedded step, but does not extend completely over the rear portion of said second part and, thereby, leaves said rear portion partially exposed;

an upper magnetic pole piece formed over said write gap layer and said partially exposed rear portion of the second part of the lower magnetic pole piece, wherein said upper magnetic pole piece comprises a front upper magnetic pole piece portion formed on the write gap layer, a rear upper magnetic pole piece portion formed on the partially exposed rear portion of the lower magnetic pole piece and a space between said front and rear upper magnetic pole piece portions that is conformally filled by a dielectric material;

an upper pole yoke that is stitched onto and magnetically connects the front and rear portions of the upper magnetic pole piece, said yoke having a vertical front surface that is recessed from a vertical front surface of said front portion of said upper magnetic pole piece; and a formation of induction coils embedded in an insulating layer formed between said upper pole yoke and the dielectric material conformally filling the space between said separated front and rear upper pole piece portions.

2. The write head of claim 1 wherein the substrate is also an upper shield.

3. The write head of claim 1 wherein the first part is formed of a layer of ferromagnetic material.

4. The write head of claim 3 wherein the ferromagnetic material is $Ni_{80}Fe_{20}$ and is plated to a thickness of between 1.0 microns and 2.0 microns.

5. The write head of claim 1 wherein each portion of the second part of the lower magnetic pole piece consists of either $Ni_{80}Fe_{20}$ or CoNiFe and is plated on to a thickness between 1.0 microns and 3.0 microns.

6. The write head of claim 1 wherein the gap between the two portions of the second part of the lower magnetic pole piece has a width between 5.0 microns and 30 microns.

7. The write head of claim 1 wherein the gap between said front and rear portions of the second part of the lower magnetic pole piece is conformally filled with a layer of alumina to form said embedded step.

8. The write head of claim 1 wherein the write gap layer is a layer of alumina formed to a thickness of between 0.05 microns and 0.5 microns.

9. The write head of claim 1 wherein each of the two portions of the upper magnetic pole piece consists of either $Ni_{45}Fe_{55}$ or CoNiFe and are formed to a thickness of between 2.5 microns and 6.0 microns.

10. The write head of claim 1 wherein the space between the two portions of the upper magnetic pole piece are conformally filled by a layer of alumina.

* * * * *